No. 722,095. PATENTED MAR. 3, 1903.
G. GEER.
MECHANICAL MOVEMENT.
APPLICATION FILED DEC. 11, 1902.
NO MODEL.
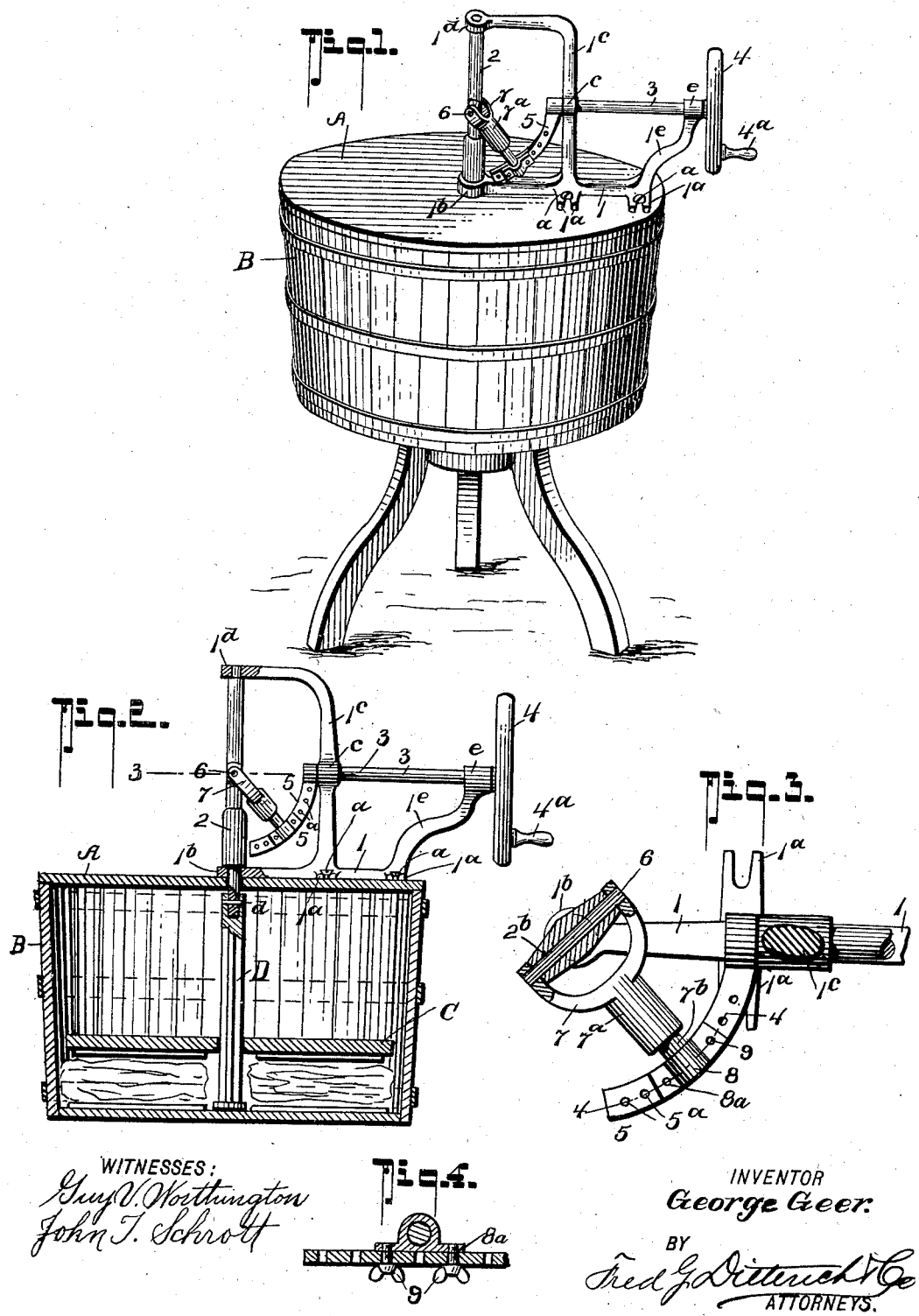
WITNESSES:
Guy V. Worthington
John T. Schrott
INVENTOR
George Geer.
BY
Fred G. Dieterich & Co.
ATTORNEYS.

UNITED STATES PATENT OFFICE.

GEORGE GEER, OF RICHMOND, VIRGINIA.

MECHANICAL MOVEMENT.

SPECIFICATION forming part of Letters Patent No. 722,095, dated March 3, 1903.

Application filed December 11, 1902. Serial No. 134,778. (No model.)

*To all whom it may concern:*

Be it known that I, GEORGE GEER, residing at Richmond, in the county of Henrico and State of Virginia, have invented a new and Improved Mechanical Movement, of which the following is a specification.

My invention relates to improvements in that type of washing-machines in which the washboard or rubber is mounted within the tub for a horizontal reciprocating motion and which motion is imparted by hand-manipulated gear or lever devices mounted on the tub-top.

In many of the machines of the character stated now in general use the power-transmitting hand-manipulated means and the connections between said means and the washboard-shaft are such that the board is reciprocated in reverse directions to such an extent as to render the rubbing action not all that is desired and such as to tend to throw the clothing acted on with a too great centrifugal thrust toward the sides and around the top, which causes unnecessary entangling of the article being treated and a frequent tearing of the same. Furthermore, in the said types of machines, as stated, the gear connections for transmitting a rotary motion of the power-shaft or vibrating motion of the lever devices have been such that considerable of the drive or power motion is lost and the transmission thereof to the washboard or rubber shaft and where vibrating-lever devices are used an excessive sweep movement of the handle or operating-lever is required, which soon tires the operator.

My invention particularly seeks to provide a simple and effective means for converting the rotary motion of a crank-handle-equipped shaft into a reciprocating motion for the rubber or washboard shaft in a simple and positively-acting manner and in which there shall be no lost motion and whereby a reciprocating movement of the rubber or washboard to the extent of ninety degrees for ordinary washing or an increased or decreased sweep movement is provided for as the conditions of the articles to be washed may make desirable.

Again, my invention comprehends a simple, inexpensive, and effectively-operating motion-converting mechanism for washing-machines and the like, including adjustable connections of such simple character that the housewife or a child old enough to operate a washing-machine can readily and in an expeditious and positive manner adjust the said converting mechanism to effect the desired reciprocating rotation of the rubber or washboard; and in its more subordinate features my invention consists of certain details of construction and peculiar combination of parts, all of which will hereinafter be fully described, and specifically pointed out in the appended claims, reference being had to the accompanying drawings, in which—

Figure 1 is a perspective view of a washing-machine equipped with my improvements. Fig. 2 is a vertical longitudinal section thereof. Fig. 3 is a horizontal section taken practically on the line 3 3 of Fig. 2. Fig. 4 is a detail section taken on the line 4 4 of Fig. 3.

In the practical application of my invention the washboard-operating means is fixedly mounted on the tub-top A, which may be detachably secured to the tub B by any approved fastening means, and the tub B may also be of any approved construction, preferably of the shape shown, mounted on detachable legs and having the usual corrugated bottom and sides. The rubber or washboard C is also of the usual construction, with a corrugated or ribbed rubbing-face, and it is mounted on the shank D to reciprocate in horizontal planes as the shank D is partially rotated in opposite directions in the manner presently explained, and the said board C is movable up and down upon the said shank, so as to adjust itself to the contents of the machine.

The operating mechanism comprises a skeleton frame, consisting of a base portion 1, having laterally-projecting claws $1^a$ for engaging with the fastening bolts or screws $a$, and said portion 1 at its inner end has an apertured boss $1^b$ to receive the vertical shaft 2, to which the upper end of the shank D is joined by the pin $d$, as shown. A vertical standard or member $1^c$ is integral with the part 1, and the upper end thereof is bent outwardly at right angles and terminates in a bearing $1^d$ to receive the upper end of the shaft 2.

At the outer end of the member 1 is an outwardly-extending bracket 1ᵉ, having a horizontal bearing *e* disposed in the horizontal plane of a bearing-aperture *c* in the member 1ᶜ, and in the said bearings *c* and *e* is journaled a rotary drive-shaft 3, that carries a fly-wheel 4, with an operating-handle 4ᵃ on the outer end.

On the inner end of the shaft 3 is fixedly held a crank member 5, which is curved on the arc of the circle having as its center a point in the axial line of the shaft 2 where the axial line of the shaft 3 projected intersects the axial line of the shaft 2, and the said crank member 5 is flat and provided with a series of apertures 5ᵃ, the purpose of which will presently appear.

At a point in the horizontal plane of the shaft 3 the shaft 2 has oppositely-projecting bosses and an aperture 2ᵇ, which extends through the bosses to receive a rod 6, the ends of which project to serve as pintles for receiving the opposite ends of a yoke 7, which has an integral hub 7ᵃ, that projects radially with respect to the shaft 2 and terminates in a stem 7ᵇ, rockably mounted in a box 8, adjustably held on the flat segmental crank member 5, and to facilitate the adjustment of the yoke on the member 5 the box 8 has a pair of threaded apertures 8ᵃ, adapted to receive the thumb-screws 9 9, that pass through the apertures 5ᵃ, as clearly shown in Fig. 4.

So far as described it will be apparent from the drawings that when rotary motion is applied to the shaft 3 it imparts motion to the segmental crank 5, which in turn imparts a revolving motion to the inner end of the yoke 7 and a double reciprocating motion to the outer ends thereof, and as the said ends are loosely joined to the two diametrically opposite points of the shaft 2 a reciprocating motion is imparted to the shaft 2 from the yoke 7 and a corresponding motion in a horizontal plane is imparted to the rubber or washboard within the tub.

The extent of the motion stated when the yoke is connected to the member 8, as shown in the drawings, will be that of ninety degrees, and thus when rotary motion is imparted to the horizontal shaft 3 a half-revolution of the shaft will reciprocate the shaft 2 a half-revolution in one direction, and on completing the revolution of the shaft 3 the shaft 2 will be turned a half-revolution in an opposite direction, and so on.

By joining the two shafts 3 and 2 in the manner stated there can be no lost motion, and a reciprocation of the washboard is thereby effected in an easy and positive manner with a minimum expenditure of power.

By adjustably connecting the yoke with the segmental crank 5 it is manifest that by moving the box 8 up nearer the shaft 3 the reciprocating motion of the shaft 2 will be proportionately decreased, and by moving the said box 8 outwardly on the member 5 the extent of the reciprocating motion of the shaft 2 will be proportionately increased, thereby providing a simple and easily-manipulated means for increasing or decreasing the reciprocating or rubbing action of the washboard in opposite directions as the character of the goods to be washed and the amount of goods held within the tub may make desirable.

Having thus described my invention, what I claim, and desire to secure by Letters Patent, is—

1. In a mechanism of the character described; a supporting-frame, a shaft journaled vertically in the said frame, a means for imparting variable reciprocating motions to the said shaft, said means including a rotary shaft, a yoke straddling the vertical shaft and pivotally joined therewith, a crank member on that end of the rotary shaft adjacent the yoke and an adjustable connection for joining the yoke with the said crank member, for the purposes described.

2. An operating mechanism for washing-machines of the character stated, comprising a frame adapted to be secured to the tub-top, said frame including a base and vertical members, one of said vertical members terminating in a horizontally-bent end, the latter and the base member having bearings to receive a vertical shaft, the vertical members of the frame having horizontal bearings, a horizontal drive-shaft revolubly mounted in the said horizontal bearings, a vertical shaft journaled in the bearings in the base and the opposing horizontal portion of the frame, a yoke pivotally connected to the vertical shaft, said yoke having a radial extension, a crank member on that end of the rotary shaft adjacent the yoke and a pivotal connection joining said crank member and the radial extension of the yoke, all being arranged substantially as shown and described.

3. A driving power for washing-machines of the character stated, comprising a suitable supporting-frame, a vertical shaft and a rotary horizontal shaft journaled thereon, a yoke adapted to straddle the vertical shaft and having its ends pivotally connected therewith, said yoke having an extension radial to the vertical shaft, the crank member on that end of the horizontal shaft adjacent the yoke, said crank member being a segment of a circle with a point on the axis of the vertical shaft as the center, and means for shiftably connecting the radial extension with the crank member, said radial extension having a rocking action on the vertical shaft, as set forth.

4. In a washing-machine power mechanism as described, the combination with the main or supporting frame, the rotary drive-shaft horizontally mounted on said frame, the actuating-shaft vertically mounted on the said frame, said shaft having laterally-projecting pintles disposed in the horizontal axial plane of the rotary shaft, a yoke straddling the vertical shaft pivotally connected with the pintles and having a stem projected radially with respect to the vertical shaft, an apertured crank member on that end of the horizontal shaft adjacent the yoke, said crank member having a segment of a circle with a point on the axis of the vertical shaft as the center, a journal-box adapted to receive the radial stem of the yoke and means for adjustably mounting the said box on the crank member toward or from the axis of the horizontal shaft, for the purposes stated.

GEORGE GEER.

Witnesses:
ALBERT E. DIETERICH,
FRED G. DIETERICH.